United States Patent
Fisher et al.

(10) Patent No.: US 8,134,606 B2
(45) Date of Patent: *Mar. 13, 2012

(54) SYSTEM AND METHOD FOR CREATING COMPOSITE IMAGES BY UTILIZING AN IMAGING DEVICE

(75) Inventors: Clay H. Fisher, Belmont, CA (US); Eric D. Edwards, San Francisco, CA (US); Michael W. Blasgen, Los Gatos, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1026 days.

This patent is subject to a terminal disclaimer.

(21) Appl. No.: 11/588,132

(22) Filed: Oct. 26, 2006

(65) Prior Publication Data

US 2007/0040913 A1 Feb. 22, 2007

Related U.S. Application Data

(63) Continuation of application No. 09/780,665, filed on Feb. 8, 2001, now Pat. No. 7,133,068.

(60) Provisional application No. 60/187,337, filed on Mar. 6, 2000.

(51) Int. Cl.
H04N 5/225 (2006.01)

(52) U.S. Cl. .................................................. 348/218.1

(58) Field of Classification Search ............... 348/218.1; 382/284, 294
See application file for complete search history.

(56) References Cited

U.S. PATENT DOCUMENTS

| | | | | |
|---|---|---|---|---|
| 4,703,186 A * | 10/1987 | Nakayama et al. | ........... | 250/566 |
| 4,793,812 A * | 12/1988 | Sussman et al. | ............... | 434/116 |
| 4,943,821 A * | 7/1990 | Gelphman et al. | ............... | 396/24 |
| 5,465,163 A * | 11/1995 | Yoshihara et al. | ............ | 358/444 |
| 5,497,150 A * | 3/1996 | Kimura et al. | ..................... | 341/1 |
| 5,497,188 A * | 3/1996 | Kaye | ................................ | 348/36 |
| 5,550,938 A * | 8/1996 | Hayakawa et al. | ........... | 382/313 |
| 5,686,960 A * | 11/1997 | Sussman et al. | ............... | 348/218.1 |
| 5,721,624 A * | 2/1998 | Kumashiro et al. | ........... | 358/450 |
| 5,729,283 A * | 3/1998 | Meyer et al. | ..................... | 348/63 |
| 5,752,113 A * | 5/1998 | Borden | ......................... | 396/428 |
| 5,838,837 A * | 11/1998 | Hirosawa et al. | ............. | 382/284 |
| 5,880,778 A * | 3/1999 | Akagi | .......................... | 348/218.1 |
| 5,956,083 A * | 9/1999 | Taylor et al. | ................ | 348/231.6 |
| 5,960,124 A * | 9/1999 | Taguchi et al. | ................ | 382/284 |
| 5,981,943 A * | 11/1999 | Berg et al. | ...................... | 250/234 |
| 5,999,662 A * | 12/1999 | Burt et al. | ....................... | 382/284 |
| 6,002,124 A * | 12/1999 | Bohn et al. | .................. | 250/208.1 |
| 6,005,681 A * | 12/1999 | Pollard | ......................... | 358/473 |
| 6,009,190 A * | 12/1999 | Szeliski et al. | ................. | 382/154 |
| 6,011,876 A * | 1/2000 | Kishner | ........................ | 382/284 |
| 6,177,957 B1 * | 1/2001 | Anderson | ................ | 348/231.99 |
| 6,304,284 B1 * | 10/2001 | Dunton et al. | .................. | 348/36 |

(Continued)

*Primary Examiner* — Jason Chan
*Assistant Examiner* — Gary C Vieaux
(74) *Attorney, Agent, or Firm* — Gregory J. Koerner; Redwood Patent Law (57) ABSTRACT

A system and method for creating composite images by utilizing a camera comprises a cradle device that transports the camera across a target area during a scanning procedure that captures and stores image data. During the scanning procedure, a motion detector captures and provides scan motion data to a scanning manager from the camera. The scanning manager may then responsively utilize the scan motion data to accurately extract still frames corresponding to the target area from the captured image data at pre-determined time intervals. A stitching software program may then access and combine the still frames generated by the scanning manager to thereby create composite images.

5 Claims, 8 Drawing Sheets

U.S. PATENT DOCUMENTS

| | | | |
|---|---|---|---|
| 6,456,323 B1 * | 9/2002 | Mancuso et al. | 348/218.1 |
| 6,466,231 B1 * | 10/2002 | Dow et al. | 345/629 |
| 6,466,262 B1 * | 10/2002 | Miyatake et al. | 382/284 |
| 6,493,469 B1 * | 12/2002 | Taylor et al. | 382/284 |
| 6,552,744 B2 * | 4/2003 | Chen | 348/218.1 |
| 6,677,981 B1 * | 1/2004 | Mancuso et al. | 348/36 |
| 6,930,703 B1 * | 8/2005 | Hubel et al. | 348/37 |
| 6,978,051 B2 * | 12/2005 | Edwards | 382/284 |
| 7,119,816 B2 * | 10/2006 | Zhang et al. | 345/634 |
| 7,373,017 B2 * | 5/2008 | Edwards et al. | 382/284 |

* cited by examiner

SYSTEM AND METHOD FOR CREATING COMPOSITE IMAGES BY UTILIZING AN IMAGING DEVICE

CROSS-REFERENCE TO RELATED APPLICATIONS

This application is a Continuation of U.S. Non-Provisional patent application Ser. No. 09/780,665, entitled "System And Method For Creating Still Images By Utilizing A Video Camera Device," filed on Feb. 8, 2001 now U.S. Pat. No. 7,133,068. This application also relates to, and claims priority in, U.S. Provisional Patent Application Ser. No. 60/187,337, entitled "Video Stream Stitching," filed on Mar. 6, 2000. The foregoing related applications are commonly assigned, and are hereby incorporated by reference.

BACKGROUND SECTION

1. Field of the Invention

This invention relates generally to techniques for capturing visual information, and relates more particularly to a system and method for creating composite images by utilizing an imaging device.

2. Description of the Background Art

Implementing effective methods for capturing visual information is a significant consideration for designers and manufacturers of contemporary electronic devices. However, effectively capturing visual information by utilizing electronic devices may create substantial challenges for system designers. For example, enhanced demands for increased device functionality and performance may require more system processing power and require additional hardware resources. An increase in processing or hardware requirements may also result in a corresponding detrimental economic impact due to increased production costs and operational inefficiencies.

Furthermore, enhanced device capability to perform various advanced operations may provide additional benefits to a system user, but may also place increased demands on the control and management of various device components. For example, an enhanced electronic device that effectively captures, processes, and displays digital image data may benefit from an efficient implementation because of the large amount and complexity of the digital data involved.

Due to factors like the growing demands on system functionality, it is apparent that developing new techniques for capturing visual information is a matter of concern for related electronic technologies. Therefore, for all the foregoing reasons, developing effective systems for capturing visual information remains a significant consideration for designers, manufacturers, and users of contemporary electronic devices.

SUMMARY

In accordance with the present invention, a system and method are disclosed for creating composite images by utilizing a camera. In one embodiment, a selected target area may preferably be positioned on an appropriate surface for effective scanning by the camera. The target area may preferably include any desired photographic target. For example, the target area may include various physical objects, graphical images, documents, or geographic locations.

Any effective and appropriate support means may then accurately align the camera over the target area for transporting the camera along a fixed scanning track to thereby effectively scan the full length of the target area from a starting index location to an ending index location. The support means preferably supports the camera in a manner that permits the camera to maintain an unobstructed view of the target area along an optical path.

A system user may initiate the scanning procedure using any appropriate manual or automatic means. In response, the support means preferably begins to move down the scanning track, and the camera preferably begins scanning the target area to capture corresponding image data. In accordance with the present invention, a motion sensor simultaneously may capture and provide scan motion data, including one or more scan speeds, to the camera.

A scanning manager coupled to the camera may preferably then create an initial still frame from the captured image data. Then, at a pre-determined time interval, the scanning manager may preferably create a new current still frame from the captured image data. The scanning manager may then preferably determine an overlap region between the current still frame and the initial still frame.

Then, a stitching software program may preferably analyze and combine the image data in the foregoing overlap region to thereby produce a single composite still image from the current still frame and the initial still frame. Next, if the scanning procedure has not been completed, then the scanning manager preferably returns to sequentially generate one or more additional current still frames which may be combined by the stitching software program to create a composite still image of the target area.

The foregoing process is described as a reiterative procedure in which sequential pairs of still frames are generated and combined into a composite image. However, in alternate embodiments, the present invention may readily create a composite still image using various other sequences and techniques. For example, in certain embodiments, the present invention may generate and concurrently combine all still frames for a given target area in a single concurrent operation. In addition, the present invention may generate and concurrently combine discrete blocks of still frames corresponding to a given target area. The present invention therefore provides an improved system and method for creating composite images by utilizing a camera device.

DETAILED DESCRIPTION

The present invention relates to an improvement in visual information capture techniques. The following description is presented to enable one of ordinary skill in the art to make and use the invention and is provided in the context of a patent application and its requirements. Various modifications to the disclosed embodiments will be readily apparent to those skilled in the art and the generic principles herein may be applied to other embodiments. Thus, the present invention is not intended to be limited to the embodiments shown, but is to be accorded the widest scope consistent with the principles and features described herein.

The present invention comprises a system and method for creating still images by utilizing a camera, and preferably includes a cradle device that transports the camera across a target area during a scanning procedure to capture and store corresponding image data. During the scanning procedure, a motion detector preferably may capture and provide scan motion data to a scanning manager from the camera. The scanning manager may then responsively utilize the scan motion data to accurately extract still frames corresponding to the target area from the captured image data at pre-determined time intervals. A stitching software program may preferably then access and combine the still frames generated by the scanning manager to thereby create composite still images.

Figure 1:
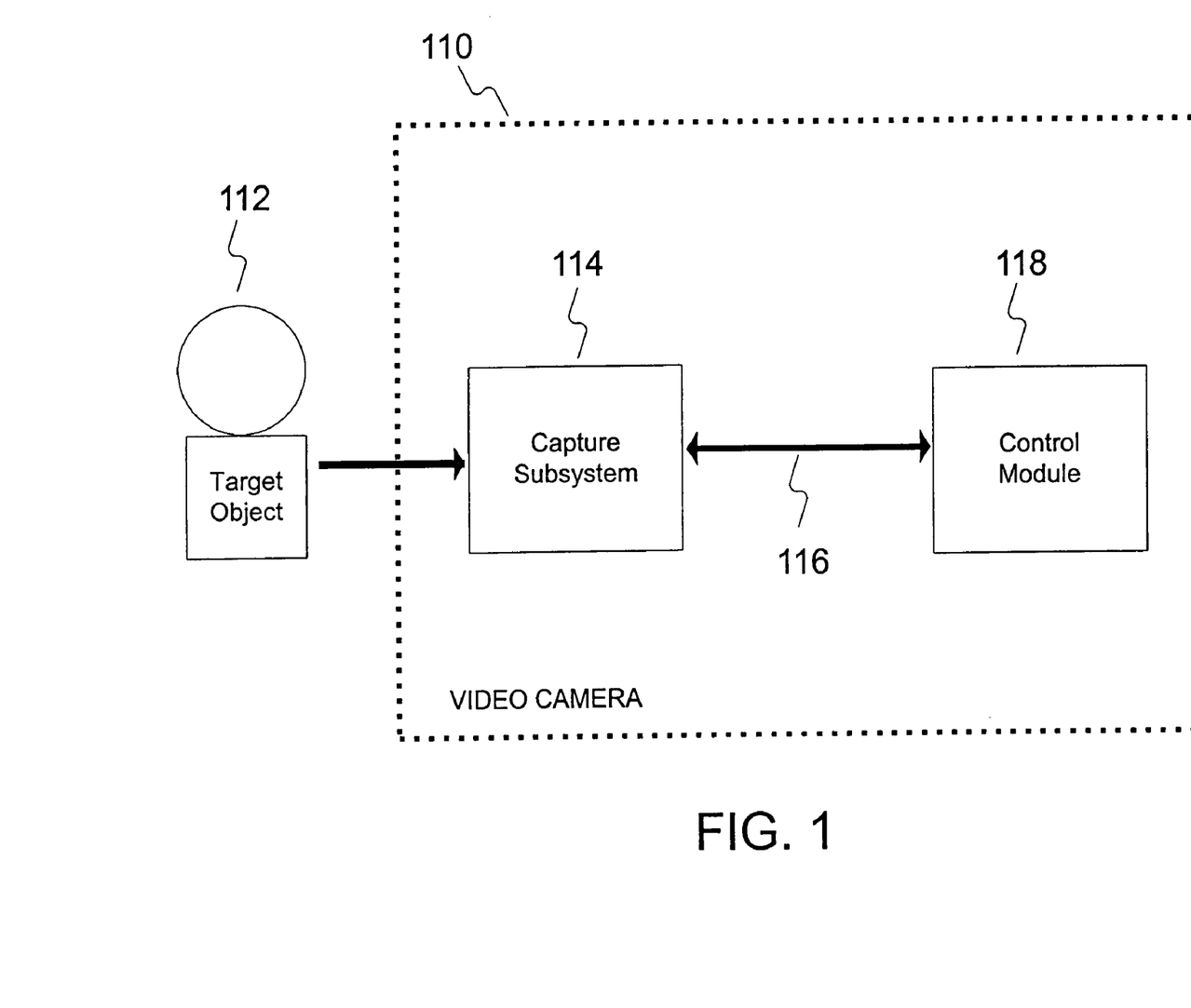
FIG. 1 is a block diagram for one embodiment of a video camera, in accordance with one embodiment of the present invention.

Referring now to FIG. 1, a block diagram for one embodiment of a video camera 110 is shown, in accordance with one embodiment of the present invention.

In the FIG. 1 embodiment, video camera 110 may include, but is not limited to, a capture subsystem 114, a system bus 116, and a control module 118. In the FIG. 1 embodiment, capture subsystem 114 may be optically coupled to a target object 112, and may also be electrically coupled via system bus 116 to control module 118.

In alternate embodiments, video camera 110 may readily include various other components in addition to, or instead of, those components discussed in conjunction with the FIG. 1 embodiment. In addition, in certain embodiments, the present invention may alternately be embodied in any appropriate type of electronic device other than the video camera 110 of FIG. 1. For example, video camera 110 may readily be implemented as part of a scanner device or other imaging device.

In the FIG. 1 embodiment, once a system user has focused capture subsystem 114 on target object 112 and requested video camera 110 to capture video data corresponding to target object 112, then control module 118 may preferably instruct capture subsystem 114 via system bus 116 to capture video data representing target object 112. The captured video data may then be transferred over system bus 116 to control module 118, which may responsively perform various processes and functions with the video data. System bus 116 may also bi-directionally pass various status and control signals between capture subsystem 114 and control module 118.

Figure 2:
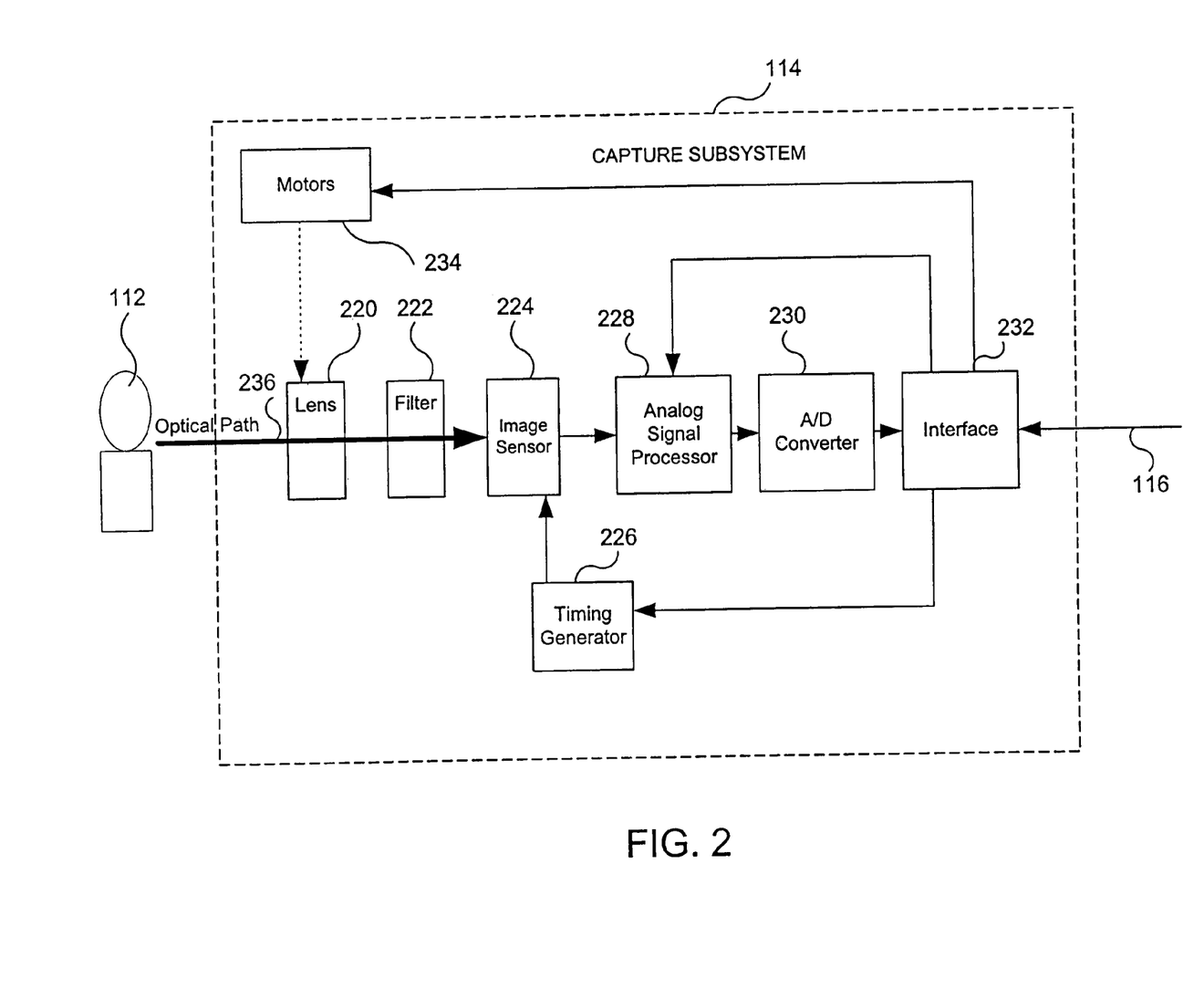
FIG. 2 is a block diagram for one embodiment of the capture subsystem of FIG. 1, in accordance with the present invention.

Referring now to FIG. 2, a block diagram for one embodiment of the FIG. 1 capture subsystem 114 is shown, in accordance with the present invention. In the FIG. 2 embodiment, capture subsystem 114 preferably comprises a lens 220 having an iris (not shown), a filter 222, an image sensor 224, a timing generator 226, an analog signal processor (ASP) 228, an analog-to-digital (A/D) converter 230, an interface 232, and one or more motors 234 to adjust the focus of lens 220. In alternate embodiments, capture subsystem 114 may readily include various other components in addition to, or instead of, those components discussed in conjunction with the FIG. 2 embodiment.

In the FIG. 2 embodiment, capture subsystem 114 may preferably capture video data corresponding to target object 112 via reflected light impacting image sensor 224 along optical path 236. Image sensor 224, which may preferably include a charged-coupled device (CCD), may responsively generate video data representing the target object 112. The video data may then be routed through ASP 228, A/D converter 230, and interface 232. Interface 232 may preferably include separate interfaces for controlling ASP 228, motors 234, and timing generator 226. From interface 232, the video data passes over system bus 116 to control module 118 for appropriate processing and storage. The target object 112 is presented for purposes of illustration, and may readily include any desired type of target object, or target area. For example, target object 112 may include various types of images, documents, physical objects, or geographic locations.

Figure 3:
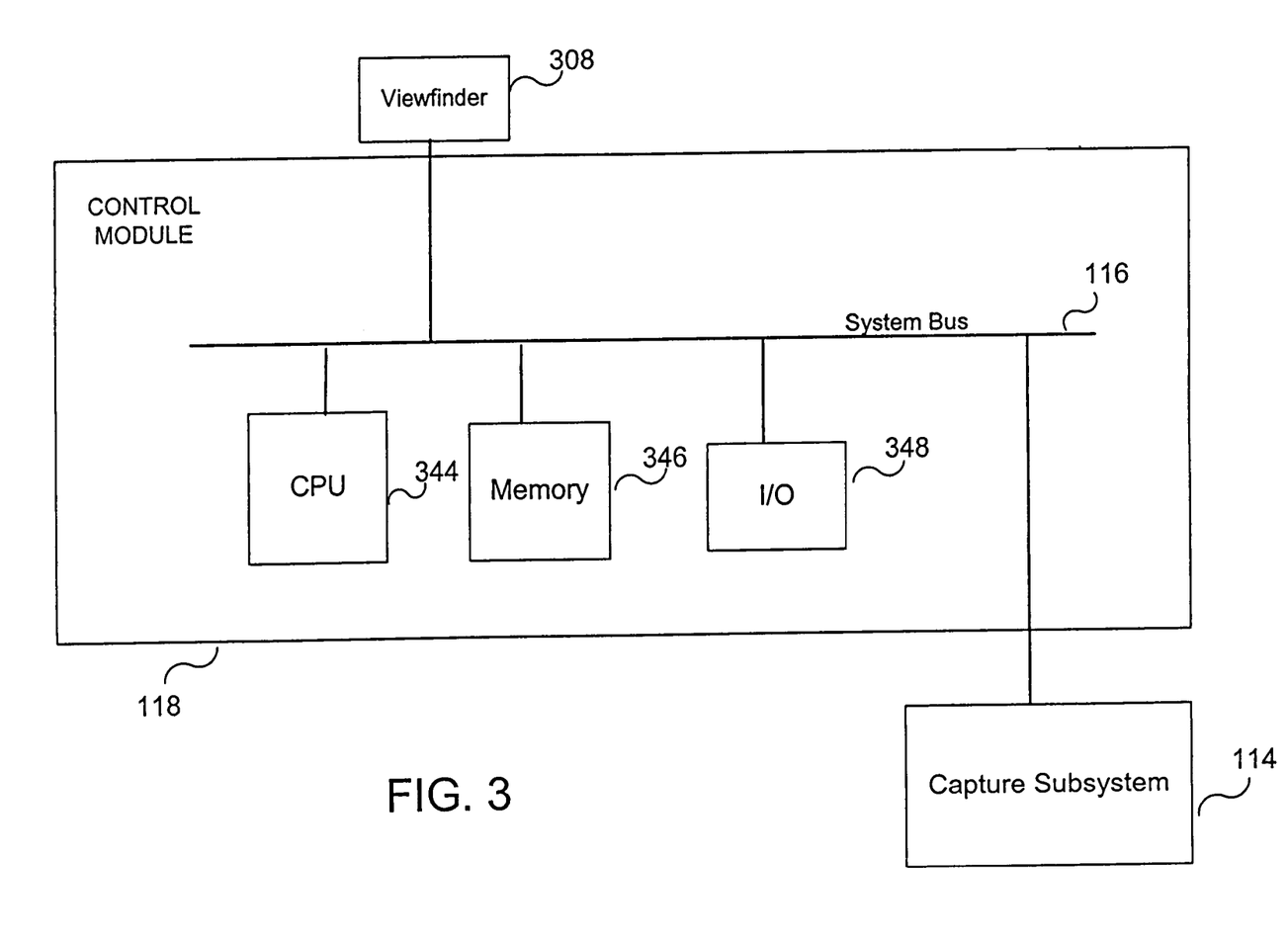
FIG. 3 is a block diagram for one embodiment of the control module of FIG. 1, in accordance with the present invention.

Referring now to FIG. 3, a block diagram for one embodiment of the FIG. 1 control module 118 is shown, in accordance with the present invention. In the FIG. 3 embodiment, control module 118 preferably includes, but is not limited to, a viewfinder 308, a central processing unit (CPU) 344, a memory 346, and an input/output interface (I/O) 348. Viewfinder 308, CPU 344, memory 346, and I/O 348 preferably are each coupled to, and communicate, via common system bus 116 that also communicates with capture subsystem 114. In alternate embodiments, control module 118 may readily include various other components in addition to, or instead of, those components discussed in conjunction with the FIG. 3 embodiment.

In the FIG. 3 embodiment, CPU 344 may preferably be implemented to include any appropriate microprocessor device. Memory 346 may preferably be implemented as one or more appropriate storage devices, including, but not limited to, video tape, read-only memory, random-access memory, and various types of non-volatile memory, such as floppy disc devices, hard disc devices, or flash memory. I/O 348 preferably may provide one or more effective interfaces for facilitating bi-directional communications between video camera 110 and any external entity, including a system user or another electronic device. I/O 348 may be implemented using any appropriate input and/or output devices. The operation and utilization of control module 118 is further discussed below in conjunction with FIGS. 4 through 8.

Figure 4:
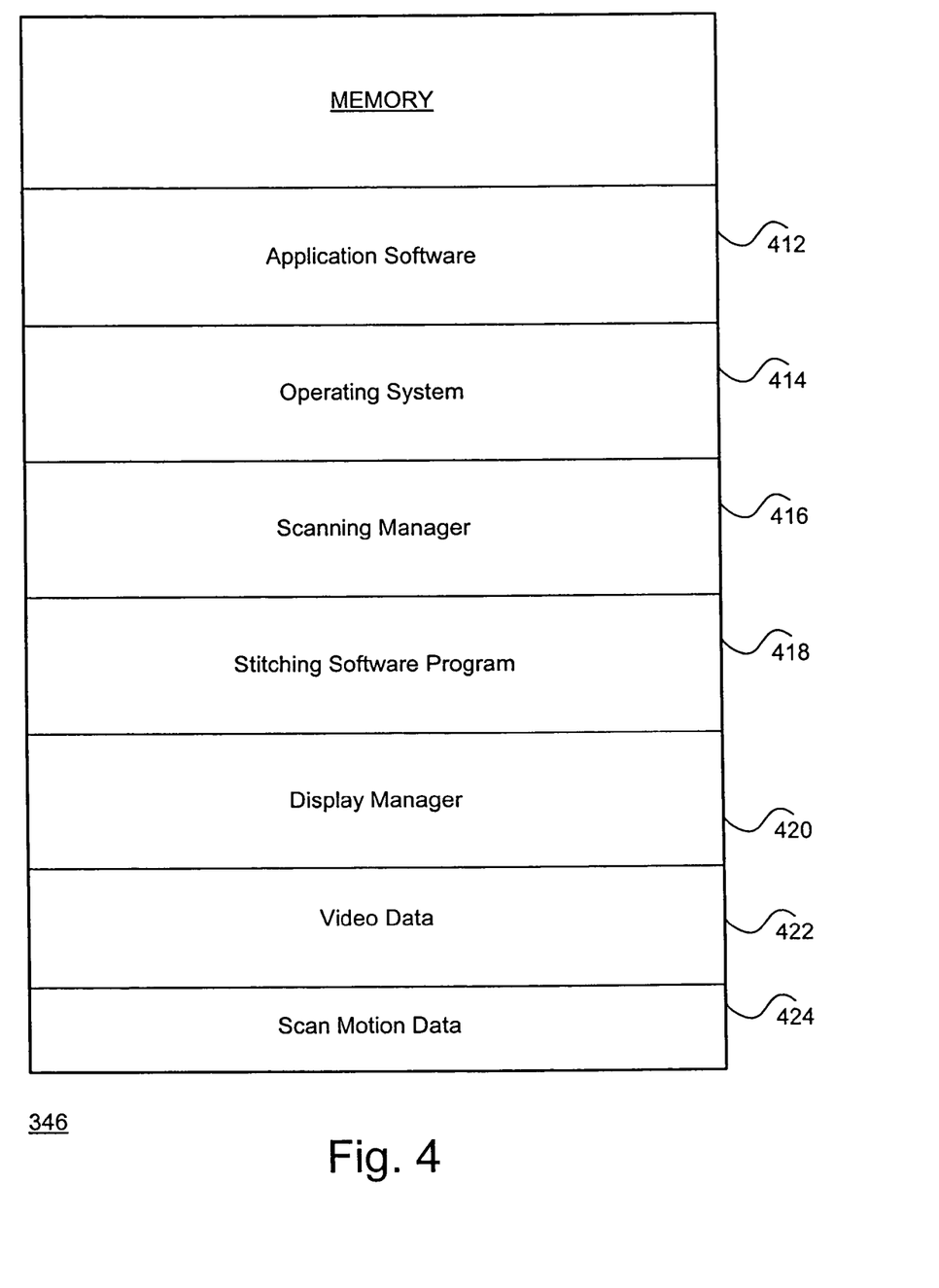
FIG. 4 is a block diagram for one embodiment of the memory of FIG. 3, in accordance with the present invention.

Referring now to FIG. 4, a block diagram for one embodiment of the FIG. 3 memory 346 is shown, in accordance with the present invention. In the FIG. 4 embodiment, memory 346 preferably includes, but is not limited to, application software 412, an operating system 414, a scanning manager 416, a stitching software program 418, a display manager 420, video data 422, and scan motion data 424. In alternate embodiments, memory 346 may readily include various other components in addition to, or instead of, those components discussed in conjunction with the FIG. 4 embodiment.

In the FIG. 4 embodiment, application software 412 may include software instructions that are preferably executed by CPU 344 (FIG. 3) to perform various functions and operations for video camera 110. The particular nature and functionality of application software 412 preferably varies depending upon factors such as the specific type and particular use of the corresponding video camera 110.

In the FIG. 4 embodiment, operating system 414 preferably controls and coordinates low-level functionality of video camera 110. In accordance with the present invention, scanning manager 416 preferably may control and coordinate the operation of a scan mode to effectively process video data for producing a corresponding composite still image. Stitching software program 418 may preferably receive a series of selected still frames of the foregoing captured video data 422 from scanning manager 416, to thereby produce a composite still image, as further discussed below in conjunction with FIGS. 5 through 8. In alternate embodiments, scanning manager 416 and/or stitching software program 418 may be implemented in an entity that is external to video camera 110. For example, scanning manager 416 and/or stitching software program 418 may be implemented in a computer device or a network service to access and process video data previously captured by video camera 110.

In the FIG. 4 embodiment, display manager 420 preferably may access video data, and responsively display the video data upon viewfinder 308. Video data 422 may preferably include one or more individual segments of video information that are each captured using capture subsystem 114 and responsively provided to control module 118, as discussed above in conjunction with FIG. 2.

In the FIG. 4 embodiment, the foregoing segments of video data 422 may be captured and stored by video camera 110 in a series of contiguous and periodic video frames. For example, in certain embodiments, the foregoing video frames may occur at a rate of thirty frames per second. However, in other embodiments, video data 422 may be captured and stored using any effective organization, timing sequence, or implementational technique. In the FIG. 4 embodiment, each of the video frames of video data 422 may include a complete set of picture element (pixels) that correspond to a particular target object 112.

In alternate embodiments, video data 422 may be configured as an series of key video frames that preferably may each be followed by a series of difference video frames that each only include those altered pixels that have changed from the key pixels in the corresponding key video frame. Video camera 110 may thus conserve substantial processing and, memory resources by not encoding and handling reoccurring pixels in video data 422. A new key video frame may preferably occur when a predetermined key threshold of change is exceeded between those pixels from a current difference frame and the pixels from the preceding key video frame. The key video frames and difference video frames preferably are arranged in a contiguous sequence, and preferably reoccur at a periodic time interval, such as thirty frames per second.

In the FIG. 4 embodiment, scan motion data 424 may preferably include any relevant information regarding the capture of video-data 422. For example, scan motion data 424 may include one or more scan speeds and/or one or more scan directions. Additional details regarding the capture and utilization of scan motion data 424 are further discussed below in conjunction with FIGS. 5 through 8.

Figure 5:
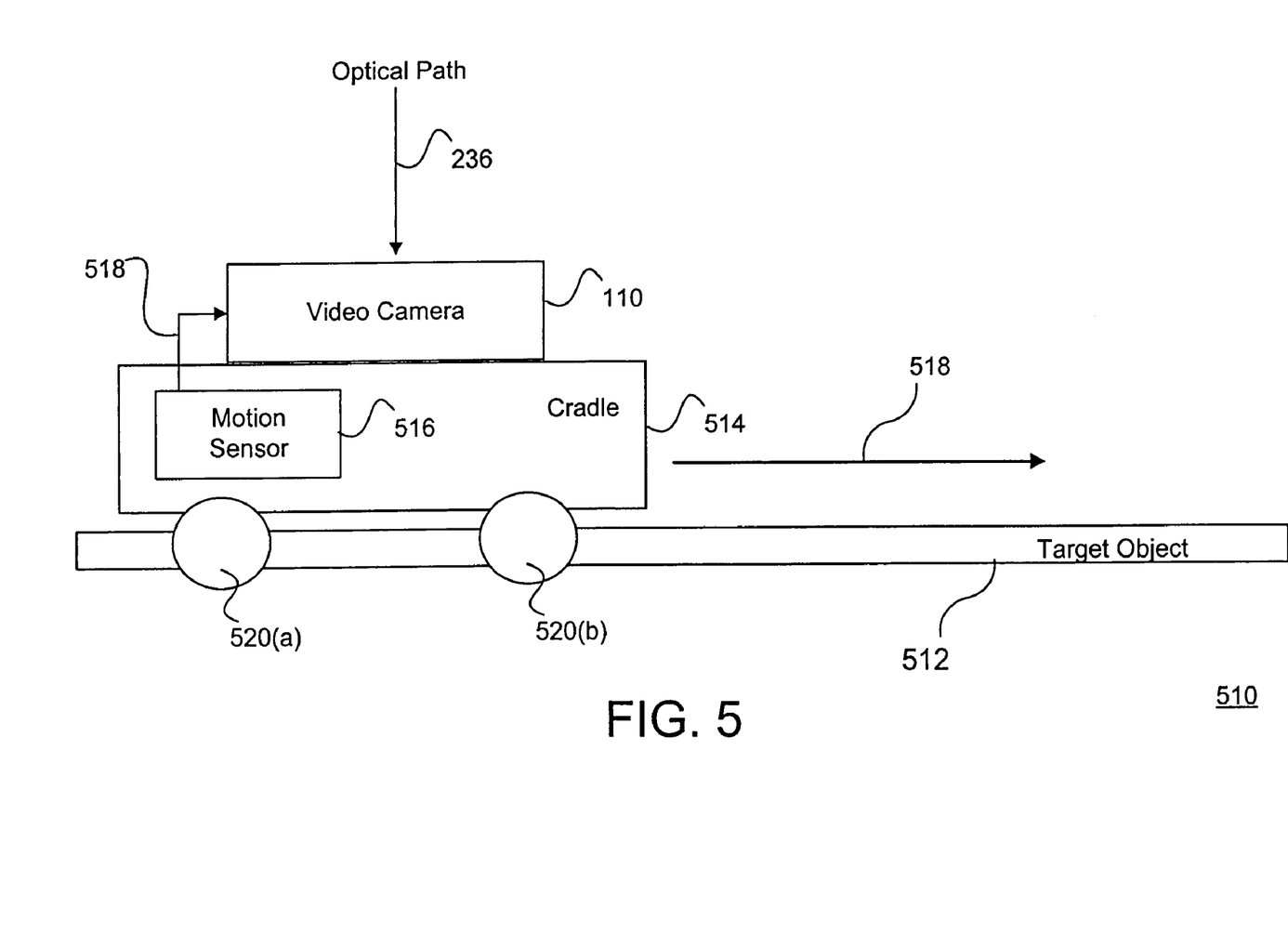
FIG. 5 is an elevation view for one embodiment of a scanning system, in accordance with the present invention.

Referring now to FIG. 5, a side elevation view for one embodiment of a scanning system 510 is shown, in accordance with the present invention. In the FIG. 5 embodiment, scanning system 510 preferably includes, but is not limited to, a target object 512, a cradle 514, a motion sensor 516, and video camera 110. In alternate embodiments, scanning system 510 may readily include various other components and functionalities in addition to, or instead of, those components and functionalities discussed in conjunction with the FIG. 5 embodiment.

In the FIG. 5 embodiment, a selected target object 512 may preferably be positioned on an appropriate surface for effective scanning by video camera 110. In the FIG. 5 embodiment, target object 512 may preferably include any desired photographic target. For example, target object 512 may include various physical objects, graphical images, documents, or geographic locations. A support device herein referred to as cradle 514 may then be accurately aligned over target object 512 on wheels (including wheels 520(*a*) and 520(*b*)) for transporting video camera 110 along a fixed scanning track in the direction of motion arrow 518, to thereby effectively scan the full length of target object 512 from a starting index location to an ending index location.

In the FIG. 5 embodiment, cradle 514 preferably supports video camera 110 in a manner that permits video camera 110 to maintain an unobstructed view of target object 512 along optical path 236. In accordance with the present invention, cradle 514 or video camera 110 may preferably include a motion sensor 516 that generates scan motion data 424 related to the motion of video camera 110 during a particular scanning procedure. In the FIG. 5 embodiment, motion sensor 516 may derive one or more scan speeds for a given scanning procedure by monitoring the rotational velocity of wheel 520(*a*) and/or wheel 520(*b*). In accordance with the present invention, motion sensor 516 may then provide the one or more scan speeds to video camera 110 via path 518.

In alternate embodiments, scanning system 510 may be implemented using any other effective configuration. For example, video camera 110 may remain stationary, while target object 110 is moved past optical path 236. Motion sensor 516 may then provide scan motion data 424 corresponding to the moving target object 512. Alternately, a reflective device may be utilized to perform a scanning procedure for a stationary video camera 110 and a stationary target object 512, and scan motion data 424 may be generated based upon the motion of the foregoing reflective device. The functionality and utilization of scanning system 510 is further discussed below in conjunction with FIGS. 6 through 8.

Figure 6:
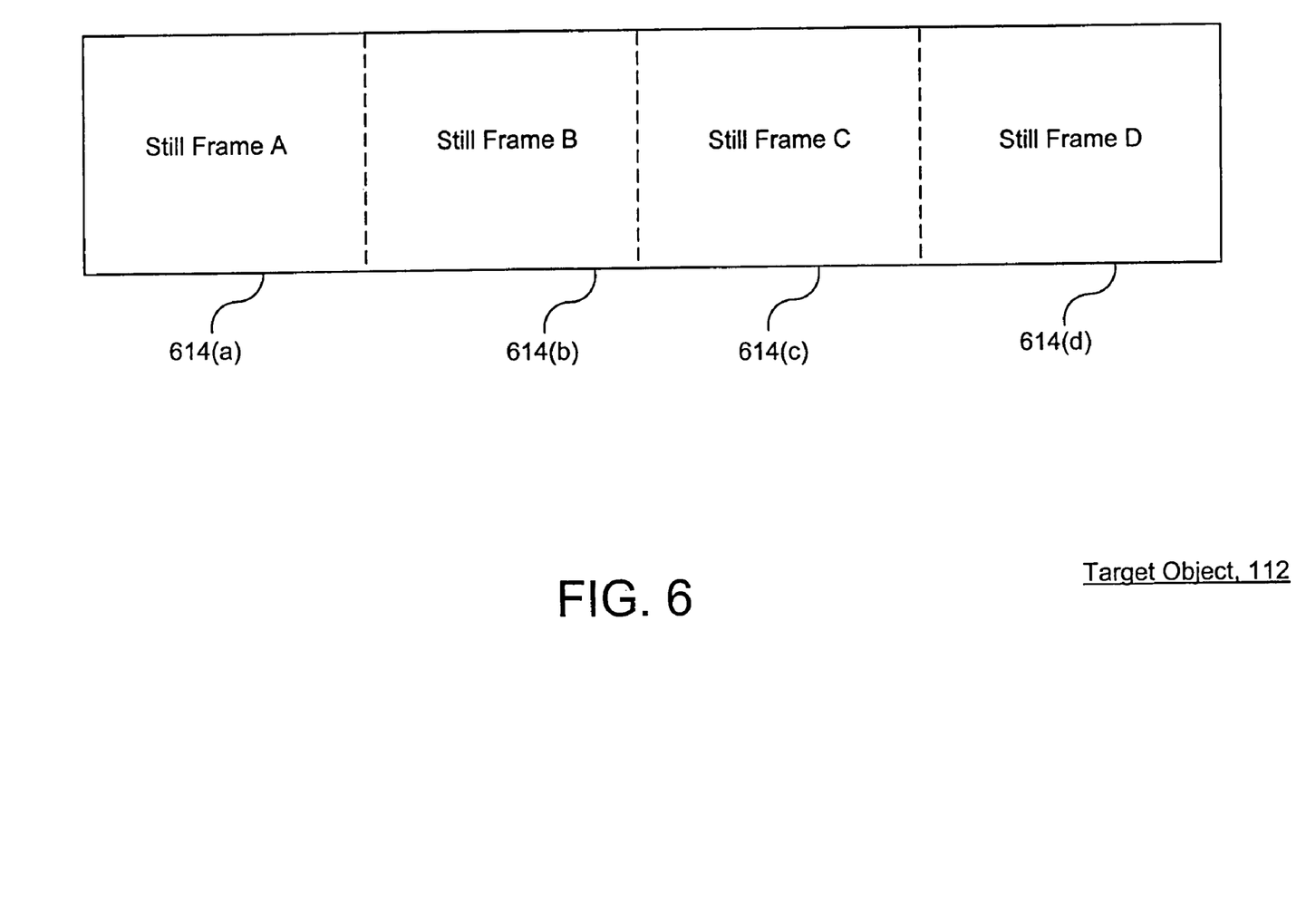
FIG. 6 is a diagram illustrating a series of still frames of a target object, in accordance with one embodiment of the present invention.

Referring now to FIG. 6, a block diagram for a series of still frames 614 of a target object 112 is shown, in accordance with one embodiment of the present invention. In the FIG. 6 embodiment, the series of still frames 614 of target object 112 includes, but is not limited to, a still frame A (614(*a*)), a still frame B (614(*b*)), a still frame C (614(*c*)), and a still frame D (614(*d*)). The FIG. 6 embodiment is presented for purposes of illustration. In alternate embodiments, a series of still frames 614 of target object 112 may readily include various other still frames 614 with various other alignments, in addition to, or instead of, those still frames 614 and alignments discussed in conjunction with the FIG. 6 embodiment. Furthermore, in alternate embodiments, target object 112 may be represented using any desired number of still frames 614.

In the FIG. 6 embodiment, scanning manager 416 preferably extracts a series of still frames 614 from a stream of video data 422, and then provides the series of still frames 614 to a stitching software program 418 which responsively combines the series of still frames 614 into a single composite still image. In the FIG. 6 example, each adjacent pair of still frames 614(*a*) through 614(*d*) are shown as being precisely aligned without overlap between adjacent still frames 614.

In accordance with the present invention, scanning manager 416 therefore preferably may generate each of the still frames, 614 at a specific time interval that depends upon the scan speed of scanning system 510 and the length of still frames 614. In practice, scanning manager 416 may preferably obtain scan motion data 424, including one or more scan speeds, from motion sensor 516. Scanning manager 416 may then calculate the specific time interval and physical location during a scanning procedure at which video camera 110 captures the particular video data 422 corresponding to each of the still frames 614 in the FIG. 6 embodiment. Scanning manager 416 then may sequentially generate each still frame 614 by extracting the appropriate still frame 614 from video data 422 at the correct time interval.

Figure 7:
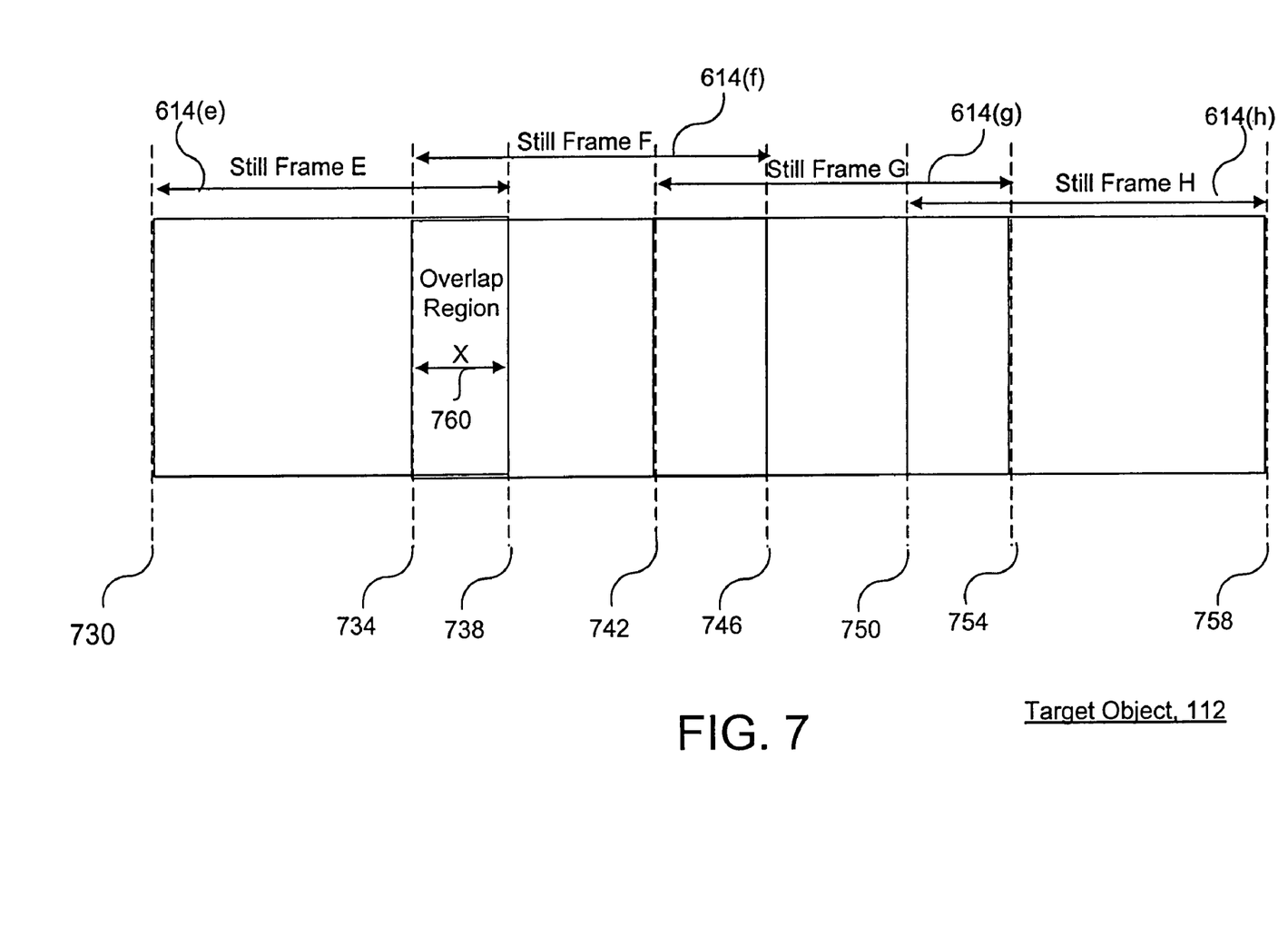
FIG. 7 is a diagram illustrating a series of overlapping still frames of a target object, in accordance with one embodiment of the present invention.

Referring now to FIG. 7, a diagram of a series of overlapping still frames 614 of a target object 112 is shown, in accordance with one embodiment of the present invention. In the FIG. 7 embodiment, the series of overlapping still frames 614 of target object 112 includes, but is not limited to, a still frame E (614(e)), a still frame F (614(f)), a still frame G (614(g)), and a still frame H (614(h)). The FIG. 7 embodiment is presented for purposes of illustration. In alternate embodiments, a series of still frames 614 of target object 112 may readily include various other still frames 614 with various other alignments, in addition to, or instead of, those still frames 614 and those alignments discussed in conjunction with the FIG. 7 embodiment. Furthermore, in alternate embodiments, target object 112 may be represented using any desired number of overlapping still frames 614.

In the FIG. 7 embodiment, still frame E (614(e)) through still frame H (614(h)) each preferably includes an adjacent still frame overlap region with the other respective adjacent still frames in the horizontal scanning direction. For example, an overlap region X (760) is shown in the FIG. 7 embodiment between still frame E (614(e)) and still frame F (614(f)), from axis 734 until axis 738. In order for stitching software program 418 to effectively create a composite still image of target object 112 by combining adjacent still frame E (614(e)) through still frame H (614(h)), an optimized adjacent still frame overlap region may be utilized. For example, stitching software program 418 may require a certain adjacent still frame overlap region in order to optimally compare and combine adjacent still frames 614 to thereby produce a single composite still image of target object 112.

In the FIG. 7 embodiment, scanning manager 416 preferably extracts a series of still frames 614 from a stream of video data 422, and then provides the series of still frames 614 to stitching software program 418 which responsively combines the series of still frames 614 into a single composite still image. In accordance with the present invention, scanning manager 416 therefore preferably may generate each of the still frames 614 at a specific time interval that depends upon the scan speed of scanning system 510 and the length of still frames 614. In practice, scanning manager 416 may preferably obtain scan motion data 424, including one or more scan speeds, from motion sensor 516. Scanning manager 416 may then calculate the specific time interval and physical location (during a scanning procedure) at which video camera 110 captures the particular video data 422 corresponding to each of the still frames 614 in the FIG. 7 embodiment. Scanning manager 416 then may sequentially generate each still frame 614 by extracting the appropriate still frame 614 from video data 422 at the correct time interval.

In the FIG. 7 embodiment, a given scan speed for scanning system 510 may be expressed by the following formula:

Scan Speed=Non-Overlapped Scan Distance/Time Interval where Non-Overlapped Scan Distance is a length of a non-overlapped region of a still frame 614 prior to a start of a next still frame 614, and Time Interval is a length of time required by cradle 514 to transport video camera 110 across the foregoing Non-Overlapped Scan Distance to a start of the next still frame 614. For example, in the FIG. 7 embodiment, a Scan Speed may be calculated using still frame E (614(e)) in which the Non-Overlapped Scan Distance is the non-overlapped region between axis 730 and axis 734, and Scan Time Interval is the length of time required for cradle 514 to travel from axis 730 to axis 734.

In the FIG. 7 embodiment, each still frame 614 preferably has a pre-determined still frame length, depending upon the type of video camera 110. Scanning manager 416 or stitching software program 418 may therefore calculate an overlap length for the foregoing overlap regions according to the following formula:

Overlap Length=Still Frame Length−Non-Overlapped Scan Distance where Overlap Length is a distance from a start of an overlap region to an end of the same overlap region. For example, in the FIG. 7 embodiment, overlap region X (760) has an Overlap Length that extends from axis 734 to axis 738.

In the FIG. 7 embodiment, a system user of video camera 110 may preferably select various desired scanning parameters for capturing video data 422 to create a still image, in accordance with the present invention. For example, a system user may preferably select a scan speed for performing a scanning procedure with scanning system 510. A system user may also preferably select a time interval at which scanning manager 416 sequentially generates new still images 614. In certain embodiments, scanning manager 416 may preferably generate an error warning on a user interface mechanism if a time interval is selected to produce still images 614 which are aligned in excess of a minimum adjacent still image overlap value.

A system user may thus select a shorter time interval for generating still frames 614 to thereby produce adjacent still images 614 with greater overlap regions. Stitching software program 418 may responsively utilize the duplicated video data in the overlap regions to generate improved photographic detail and greater resolution in the final composite still image. Conversely, a system user may select a longer time interval for generating still frames 614 to simplify and expedite the operation of scanning manager 416 and stitching software program 418.

The adjacent overlapping still frames 614 may thus be combined into a composite still image by utilizing stitching software program 418 or any other effective means, from either within video camera 110 or external to video camera 110. In certain embodiments of the present invention, scanning manager 416 and display manager 420 may present various types of user interfaces upon viewfinder 308 or elsewhere on video camera 110. For example, a "scan mode" indicator with various selected parameter indicia maybe displayed to indicate the current performance of a corresponding scanning procedure by video camera 110.

The FIG. 7 embodiment is disclosed with respect to a video camera 110 in which video data 422 is captured in a sequence that moves from left to right across a given target object 112. However, appropriate changes to the implementation and configuration of video camera 110 may readily be made to facilitate the capture of successive adjacent images while moving the video camera 110 in any desired direction. For example, a system user may utilize a user interface mechanism to choose from a selectable capture sequence that includes one or more of a left-right sequence, a right-left sequence, an up-down sequence, and a down-up sequence.

Figure 8:
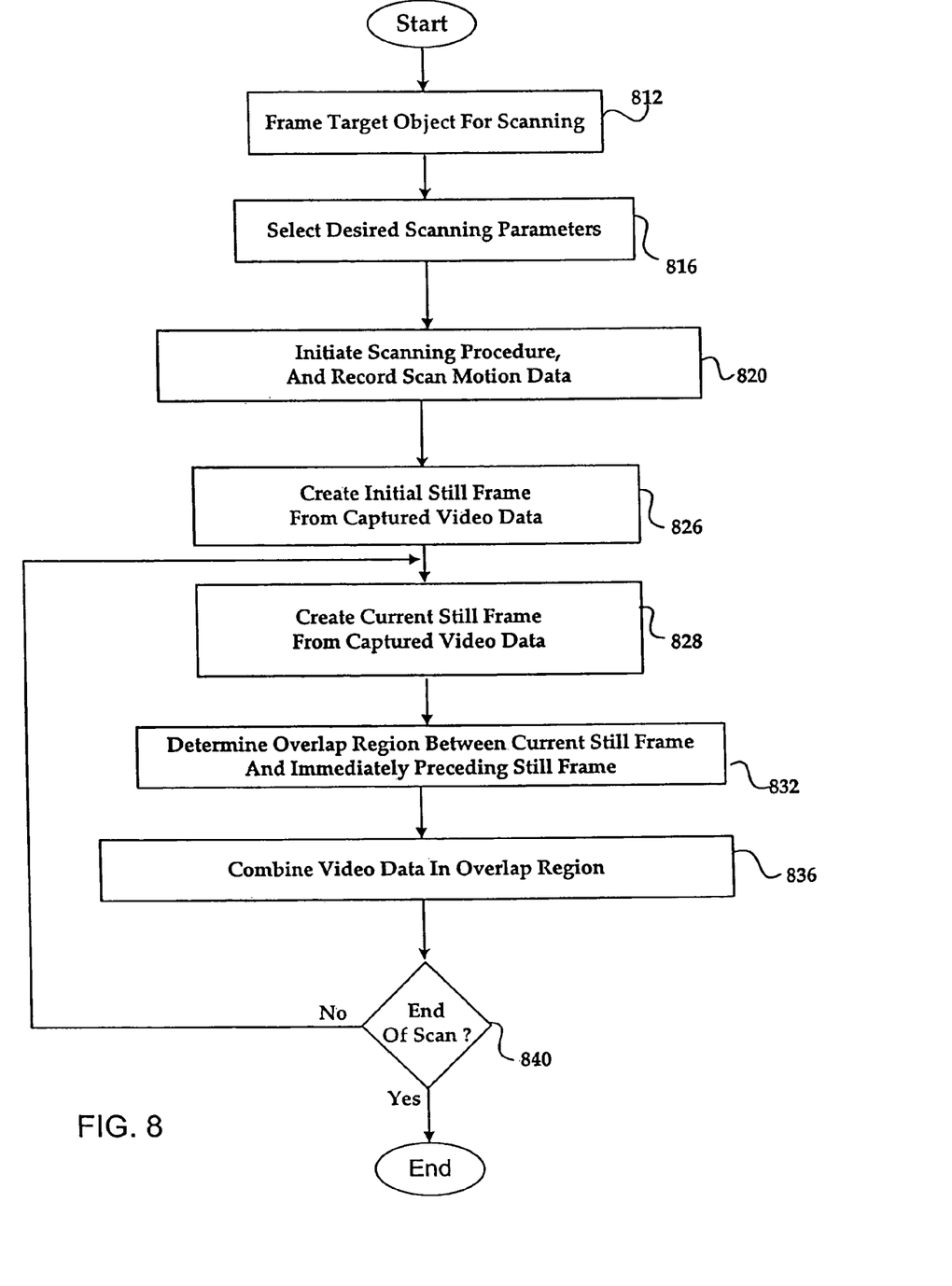
FIG. 8 is a flowchart of method steps for creating still images by utilizing a video camera, in accordance with one embodiment of the present invention.

Referring now to FIG. 8, a flowchart of method steps for creating live images by utilizing a camera 110 is shown, in accordance with one embodiment of the present invention. The FIG. 8 embodiment is presented for purposes of illustration, and, in alternate embodiments, the present invention may readily utilize various other steps and sequences than those discussed in conjunction with the FIG. 8 embodiment.

In the FIG. 8 embodiment, initially, in step 812, a system user may utilize scanning system 510 to frame a selected target area 512 for performing a scanning procedure. In certain embodiments, camera 110 may include manual and/or automatic zoom and focus mechanisms to thereby accommodate any size of target object 512. In addition, cradle 514 may include various types of photographic lighting devices to effectively illuminate target object 512.

In step 816, the system user may select any desired scanning parameters for performing the scanning procedure. For example, as discussed above in conjunction with FIG. 7, scanning system 510 may include a scan resolution control, a scan direction control, a scan speed control, and/or a time interval control for sequentially generating still frames 614.

Next, in step 820, the system user may initiate the scanning procedure using any appropriate manual or automatic means. In response, scanning system 510 preferably begins scanning target area 512 and capturing image data 422. In accordance with the present invention, motion sensor 516 simultaneously may capture and provide scan motion data 424, including one or more scan speeds, to camera 110. In step 826, scanning manager 416 may preferably create an initial still frame 614 from the captured image data 422. Then, in step 828, at a pre-determined time interval, scanning manager 416 may preferably create a new current still frame 614 from the captured image data 422.

In step 832, either scanning manager 416 or stitching software program 418 may preferably determine an overlap region between the foregoing current still frame 614 and an immediately preceding still frame 614. In accordance with the present invention, scanning manager 416 or stitching software program 418 may utilize any effective technique to determine the overlap region, including the techniques discussed above in conjunction with FIG. 7.

Then, in step 836, stitching software program 418 may preferably analyze and combine the image data 422 in the foregoing overlap region to thereby produce a single composite still image from the current still frame 614 and the immediately-preceding still frame 614. In step 840, scanning system 510 preferably determines whether the scanning procedure has been completed. In certain embodiments, a scan end index of scanning system 510 may indicate that the entire target object 512 has been scanned, and that the scanning procedure has therefore been completed. In the event that the scanning procedure has been completed, the FIG. 8 process terminates. However, if the scanning procedure has not been completed, then the FIG. 8 process preferably returns to foregoing step 828 to sequentially generate one or more additional current still frames 614 for use by scanning manager 416 and stitching software program 418 in creating a composite still image of target object 512.

The FIG. 8 process is described as a reiterative procedure in which sequential pairs of still frames are generated and combined into a composite still image. However, in alternate embodiments, the present invention may readily create a composite still image using various sequences and technique other that those discussed in conjunction with the FIG. 8 embodiment. For example, in alternate embodiments, the present invention may generate and combine all still frames 614 for a given target object 512 in a single concurrent operation. Alternately, the present invention may generate and combine a number of discrete still frame blocks that are each comprised of multiple still frames 614 from a given target object 512.

The invention has been explained above with reference to certain embodiments. Other embodiments will be apparent to those skilled in the art in light of this disclosure. For example, the present invention may readily be implemented using configurations and techniques other than those described in the embodiments above. Additionally, the present invention may effectively be used in conjunction with systems other than those described above. Therefore, these and other variations upon the discussed embodiments are intended to be covered by the present invention, which is limited only by the appended claims.

What is claimed is:

1. A system for creating a composite image of a target area by utilizing an imaging device, comprising:

a scanning manager of said imaging device for analyzing scan motion data from a scanning procedure that captures a frame sequence corresponding to said target area, said scanning manager extracting still frames from said frame sequence at a selectable time interval entered by a system user, a stitching software program responsively generating said composite image corresponding to said target area by utilizing said still frames and said scan motion data, said stitching software program generating said composite image by combining said image data in frame overlap regions between said still frames, said imaging device being initially positioned at a starting index of a scan path to allow said imaging device to frame said target area using a focus mechanism and a zoom mechanism, said system user entering scan parameters into said imaging device for performing said scanning procedure, said scan parameters including a scan speed control, a scan direction control, a still frame time interval control, a scan overlap control, and a scan resolution control.

2. The system of claim 1 wherein said imaging device generates an error warning on a user interface when said system user enters an invalid scan parameter, said invalid scan parameter including a negative overlap setting which would cause still images from said image data to be aligned in excess of a minimum adjacent still image overlap value.

3. A system for creating a composite image of a target area by utilizing an imaging device, comprising:

a scanning manager of said imaging device for analyzing scan motion data from a scanning procedure that captures a frame sequence corresponding to said target area, said scanning manager extracting still frames from said frame sequence at a selectable time interval entered by a system user, a stitching software program responsively generating said composite image corresponding to said target area by utilizing said still frames and said scan motion data, said stitching software program generating said composite image by combining said image data in frame overlap regions between said still frames, said imaging device being initially positioned at a starting index of a scan path to allow said imaging device to frame said target area using a focus mechanism and a zoom mechanism, said imaging device moving along said scan path during said scanning procedure, said imaging device responsively beginning to capture and store image data that corresponds to said target area, a display manager in said imaging device displaying an active scan mode indicator on a user interface of said imaging device during said scanning procedure, said active scan mode indicator displaying user settings for said scan parameters including a scan speed, a scan direction, and said selectable time interval.

4. A system for creating a composite image of a target area by utilizing an imaging device, comprising:

a scanning manager of said imaging device for analyzing scan motion data from a scanning procedure that captures a frame sequence corresponding to said target area, said scanning manager extracting still frames from said frame sequence at a selectable time interval entered by a system user, a stitching software program responsively generating said composite image corresponding to said target area by utilizing said still frames and said scan motion data, said stitching software program generating said composite image by combining said image data in frame overlap regions between said still frames, a system user reducing said selectable time interval to create a greater overlap region and produce greater resolution characteristics in said composite image.

5. A system for creating a composite image of a target area by utilizing an imaging device, comprising:
  a scanning manager of said imaging device for analyzing scan motion data from a scanning procedure that captures a frame sequence corresponding to said target area, said scanning manager extracting still frames from said frame sequence at a selectable time interval entered by a system user, a stitching software program responsively generating said composite image corresponding to said target area by utilizing said still frames and said scan motion data, said stitching software program generating said composite image by combining said image data in frame overlap regions between said still frames, a system user increasing said selectable time interval to create a smaller overlap region and require less processing to produce said composite image.

* * * * *